United States Patent
Kurosawa et al.

(10) Patent No.: US 6,756,690 B2
(45) Date of Patent: Jun. 29, 2004

(54) MOLDING DIE SET AND SEMICONDUCTOR DEVICE FABRICATED USING THE SAME

(75) Inventors: Shin Kurosawa, Miyagi (JP); Akira Sugai, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 253 days.

(21) Appl. No.: 10/277,057

(22) Filed: Oct. 22, 2002

(65) Prior Publication Data

US 2003/0042625 A1 Mar. 6, 2003

Related U.S. Application Data

(62) Division of application No. 09/689,760, filed on Oct. 13, 2000, now Pat. No. 6,491,508.

(30) Foreign Application Priority Data

Nov. 5, 1999 (JP) .......................................... 11-315311

(51) Int. Cl.⁷ .............................................. H01L 23/28
(52) U.S. Cl. ...................................... 257/787; 257/678
(58) Field of Search ................................ 257/787, 678, 257/797; 425/116, 544

(56) References Cited

U.S. PATENT DOCUMENTS

| | | | | |
|---|---|---|---|---|
| 4,767,308 A | * | 8/1988 | Adams | 249/141 |
| 4,861,251 A | * | 8/1989 | Moitzger | 249/119 |
| 4,963,087 A | * | 10/1990 | Aida et al. | 264/336 |
| 5,082,615 A | * | 1/1992 | Sakai | 264/102 |
| 5,336,272 A | * | 8/1994 | Tsutsumi et al. | 264/272.17 |
| 5,366,364 A | * | 11/1994 | Tanaka et al. | 249/95 |
| 5,507,633 A | * | 4/1996 | Osada et al. | 425/116 |
| 5,750,154 A | * | 5/1998 | Maeda et al. | 249/141 |
| 5,753,538 A | * | 5/1998 | Kuno et al. | 249/65 |
| 5,821,161 A | * | 10/1998 | Covell et al. | 257/704 |
| 5,834,035 A | * | 11/1998 | Osada et al. | 249/141 |

FOREIGN PATENT DOCUMENTS

| | | | | | |
|---|---|---|---|---|---|
| JP | 64028833 A | * | 1/1989 | | 425/116 |
| JP | 05138691 A | * | 6/1993 | | 425/116 |
| JP | 11145169 A | * | 5/1999 | | |

* cited by examiner

*Primary Examiner*—Roy Potter
(74) *Attorney, Agent, or Firm*—Rabin & Berdo, PC

(57) ABSTRACT

A molding die set includes a first molding die which comprises cavities and a parting surface; a second molding die which comprises cavities and a parting surface arranged to face the first molding die; and an O-ring supported on the first molding die to surround the cavities and to have a peripheral line which does not extend outwardly from the parting surface.

20 Claims, 13 Drawing Sheets

MOLDING DIE SET AND SEMICONDUCTOR DEVICE FABRICATED USING THE SAME

This is a divisional of application Ser. No. 09/689,760, filed Oct. 13, 2000, now U.S. Pat. No. 6,491,508, the subject matter of which is hereby incorporated herein by reference.

CROSS REFERENCE TO RELATED APPLICATION

This application claims the priority of application Ser. No. H11-315311, filed Nov. 5, 1999 in Japan, the subject matter of which is incorporated here by reference.

TECHNICAL FIELD OF THE INVENTION

The present invention relates to a molding die set used for fabricating a semiconductor apparatus, and to a method for fabricating a semiconductor apparatus using such a molding die set.

BACKGROUND OF THE INVENTION

According to a conventional technology, surface voids and/or inner voids may be made in a semiconductor package when a semiconductor apparatus, such as IC and LSI, is resin-molded using a thermosetting resin. Thus molded package is treated as defective. In order to prevent voids in a semiconductor package, a mold chase unit is designed to be able to reduce the pressure therein.

OBJECTS OF THE INVENTION

Accordingly, an object of the present invention is to provide a molding die set whereby a molding process can be carried out at a desirable pressure-reduced condition in cavities.

Another object of the present invention is to provide a semiconductor device package which is fabricated to reduce voids generated in a molded package.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

(1) First Aspect of the Present Invention

According to a first aspect of the present invention, a molding die set includes a first molding die which comprises cavities and a parting surface; a second molding die which comprises cavities and a parting surface arranged to face the first molding die; and an O-ring supported on the first molding die to surround the cavities and to have a peripheral line which does not extend outwardly from the parting surface.

In the first aspect of the present invention, the second molding die may have a projection which extends outwardly from the parting surface so that the projection is in contact with the O-ring when the first and second molding dies are clamped to each other. In one case, the first molding die may have a groove in which the O-ring is completely contained, and the projection of the second molding die may have an end which goes into the groove to be in contact with the O-ring when the first and second molding dies are clamped to each other. In another case, the first molding die may have a groove in which the O-ring is supported, the O-ring partially being exposed from the groove toward the second molding die, and the projection may have an end which is wider than the groove so that an outer surface of the projection is in contact with the exposed portion of the O-ring when the first and second molding dies are clamped to each other. In still another case, the first molding die may have a side with a groove in which the O-ring is supported, and the projection may have an inner side which is in contact with the O-ring when the first and second molding dies are clamped to each other.

(2) Second Aspect of the Present Invention

According to a second aspect of the present invention, a molding die set includes a molding die which comprises cavities, ejector holes each of which extends to the corresponding cavity; ejector pins each of which is movably arranged inside the corresponding ejector hole; and sealing members each of which air-seals the corresponding ejector hole.

In the second aspect of the present invention, the sealing members may be O-rings each of which is arranged to surround the corresponding ejector pin. In one case, the molding die set may further include a cavity block comprising the cavities; and a cavity holder supporting the cavity block. Each of the ejector holes is formed through the cavity block and cavity holder to have a wider diameter portion in which the O-ring is set. Each of the ejector pins may have a flange which is in contact with the corresponding O-ring to improve air sealing function.

(3) Third Aspect of the Present Invention

According to a third aspect of the present invention, a molding die set includes a molding die which comprises cavities, pressure reducing paths formed around the cavities; and a plurality of pressure reducing ports connected to the pressure reducing paths, each of the pressure reducing ports being arranged so as to minimize the distance from the farthest cavity.

In the third aspect of the present invention, the cavities may be arranged on two parallel lines in each of the first and second molding dies, the pressure reducing paths are arranged at the both sides of the lines of cavities, and the pressure reducing ports are arranged at least at the center of each of the pressure reducing paths.

A semiconductor device package according to the present invention is fabricated using one of the above described molding die sets of the first to third aspects of the present invention.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
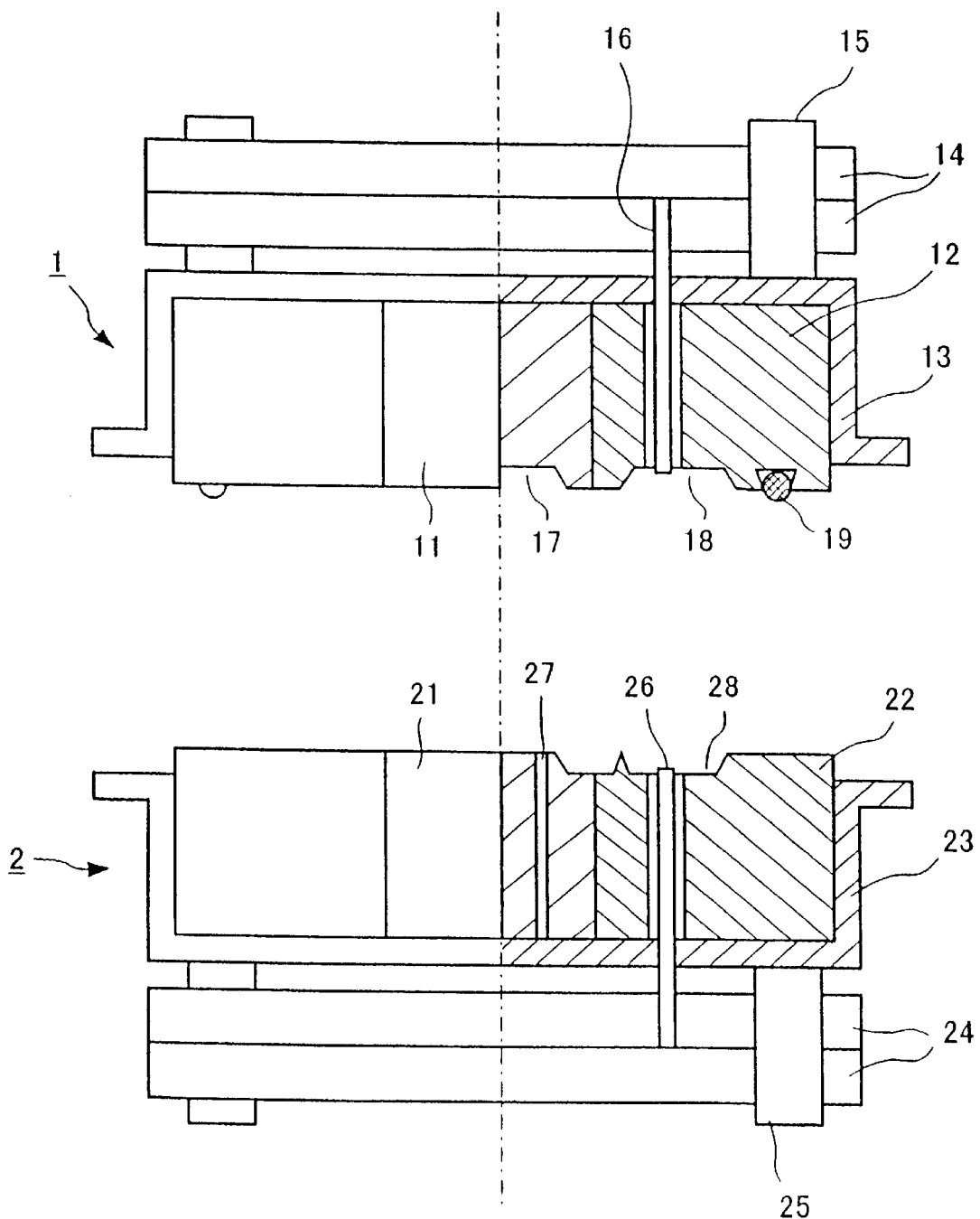
FIG. 1 is a partially cross-sectional view illustrating a conventional molding die set.

For better understanding of the present invention, a conventional technology is first described. FIG. 1 shows a conventional molding die set, in which the right half is only shown in sectional view. The conventional molding die set includes a upper molding die 1 and a lower molding die 2. The upper molding die 1 includes a mold chase unit composed of a cull block 11, cavity block 12 and a cavity holder 13. The cull block 11 is arranged at the center of the upper molding die 1. The cavity block 12 is arranged at the both sides of the cull block 11, and is supported by the cavity holder 13.

The mold chase unit (11, 12 and 13) is supported by ejector plates 14 and support pins 15. The cull block 11 is provided with a cull 17. The cavity block 12 has a plurality of cavities 18. The upper molding die 1 further includes ejector pins 16 each of which extends through the cavity holder 13 and cavity block 12 for each cavity 18. The ejector pins 16 are used when molded products are unloaded from the molding die set. The upper molding die 1 still further includes an O-ring 19 surrounding cavities 18 to air-seal and provide a pressure-reduced structure.

The lower molding die 2 includes a mold chase unit composed of a pot block 21, cavity block 22 and a cavity holder 23. The pot block 21 is arranged at the center of the lower molding die 2. The cavity block 22 is arranged at the both sides of the pot block 21, and is supported by the cavity holder 23. The pot block 21 has a pot 27 therein.

The mold chase unit (21, 22 and 23) is supported by ejector plates 24 and support pins 25. The cull block 21 is provided with a cull 27. The cavity block 22 has a plurality of cavities 28. The lower molding die 2 further includes ejector pins 26 each of which extends through the cavity holder 23 and cavity block 22 for each cavity 28. The ejector pins 26 are used when molded products are unloaded from the molding die set.

In operation, when the upper and lower molding dies 1 and 2 are clamped to each other, the O-ring 19 of the upper molding die 1 is in contact with a parting surface of the lower molding die 2, so that the mold chase units are air-sealed to provide a pressure-reduced or vacuumed condition.

According to the above described conventional molding die set, however, the pressured-reduced structure in the mold chases, especially in the cavities 18, may not work good enough. The following may be the reasons:

(1) When the surface of the molding dies are cleaned with a brush after a resin-mold process, the brush scrubs the O-ring too. As a result, the O-ring is worn away and broken; and therefore, an air leakage is made.

(2) Air leaks from around the ejector pins, so that it is difficult to maintain the appropriate pressure in the cavities.

(3) The conventional molding die set includes a pressure-reduction port from which a vacuum is drawn, and a run off of bearing stress. It is difficult to control the internal pressure of the plural cavities equally or in good balance.

First Preferred Embodiment

Figure 2:
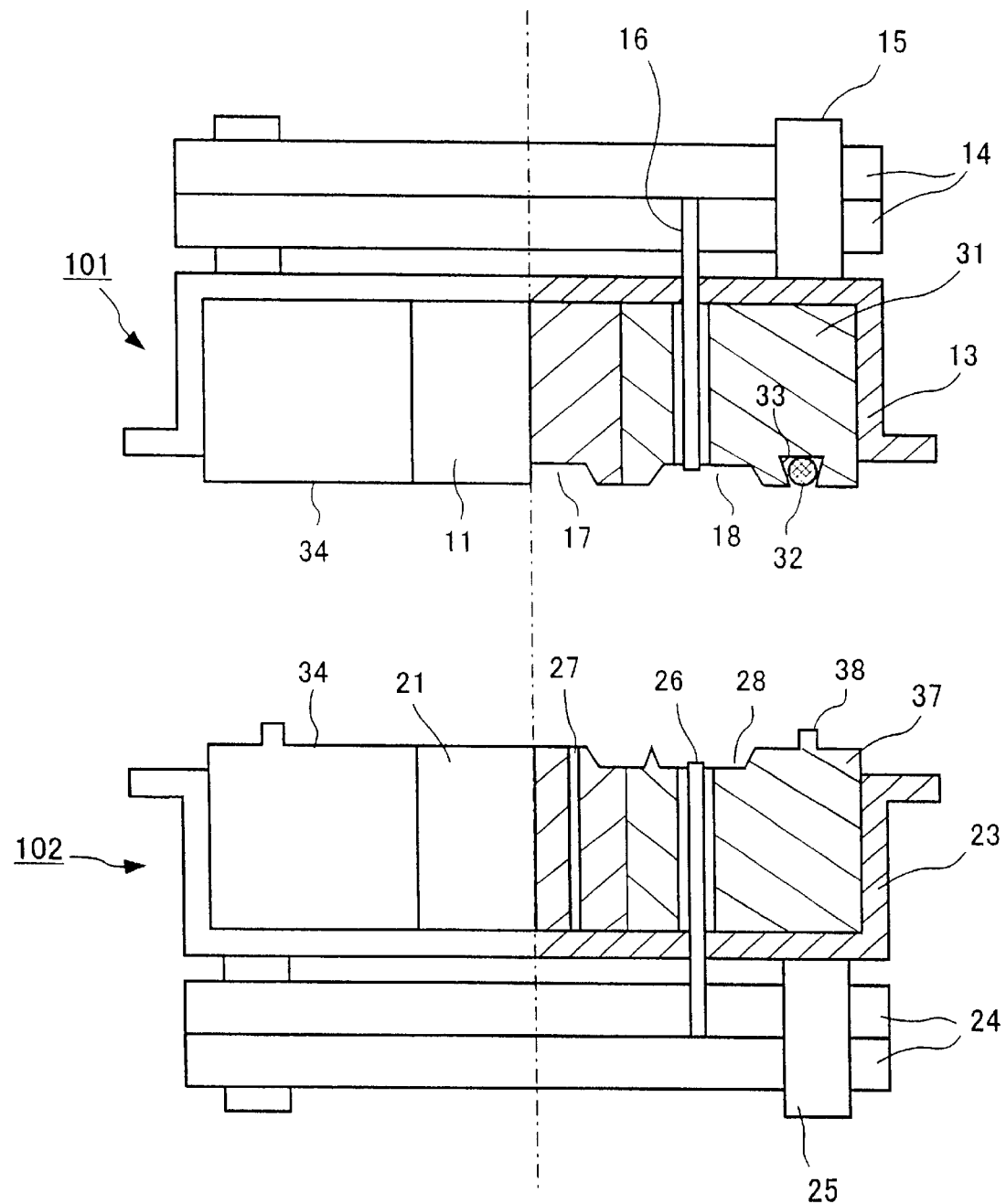
FIG. 2 is a partially cross-sectional view illustrating a molding die set according to a first preferred embodiment of the present invention.

FIG. 2 shows a molding die set according to a first preferred embodiment of the present invention, in which the right half is only shown in sectional view. The molding die set includes an upper molding die 101 and a lower molding die 102. The upper molding die 101 includes a mold chase unit composed of a cull block 11, cavity block 31 and a cavity holder 13. The cull block 11 is arranged at the center of the upper molding die 101. The cavity block 31 is arranged at both sides of the cull block 11, and is supported by the cavity holder 13.

The mold chase unit (11, 31 and 13) is supported by ejector plates 14 and support pins 15. The cull block 11 is provided with a cull 17. The cavity block 31 has a plurality of cavities 18. The upper molding die 101 further includes ejector pins 16 each of which extends through the cavity holder 13 and cavity block 31 for each cavity 18. The ejector pins 16 are used when molded products are unloaded from the molding die set. The upper molding die 101 still further includes an O-ring 32 provided at the bottom of the cavity block 31 to surround cavities 18 and to air-seal and provide a pressure-reduced structure.

The lower molding die 102 includes a mold chase unit composed of a pot block 21, cavity block 37 and a cavity holder 23. The pot block 21 is arranged at center of the lower molding die 102. The cavity block 37 is arranged at both sides of the pot block 21, and is supported by the cavity holder 23. The pot block 21 has a pot 27 therein.

The mold chase unit (21, 37 and 23) is supported by ejector plates 24 and support pins 25. The cull block 21 is provided with a cull 27. The cavity block 37 has a plurality of cavities 28. The lower molding die 102 further includes ejector pins 26 each of which extends through the cavity holder 23 and cavity block 37 for each cavity 28. The ejector pins 26 are used when molded products are unloaded from the molding die set.

The O-ring 32 is supported in a groove 33 designed to be deep enough so that a peripheral line or the lowest line of the O-ring 32 does not project or stick out of a parting surface 34. In other words, the O-ring 32 is inset or positioned inwardly from the parting surface 34. The groove 33 is designed to have a wide bottom and a narrow opening end.

On the other hand, the cavity block 37 of the lower molding die 102 is provided with a projection 38 that is to be in contact with the O-ring 32. The projection 38 is formed to project out of the parting surface 34 so as to push up the O-ring 32 when the upper and lower molding dies 101 and 102 are clamped to each other for molding operation.

Figure 3A:
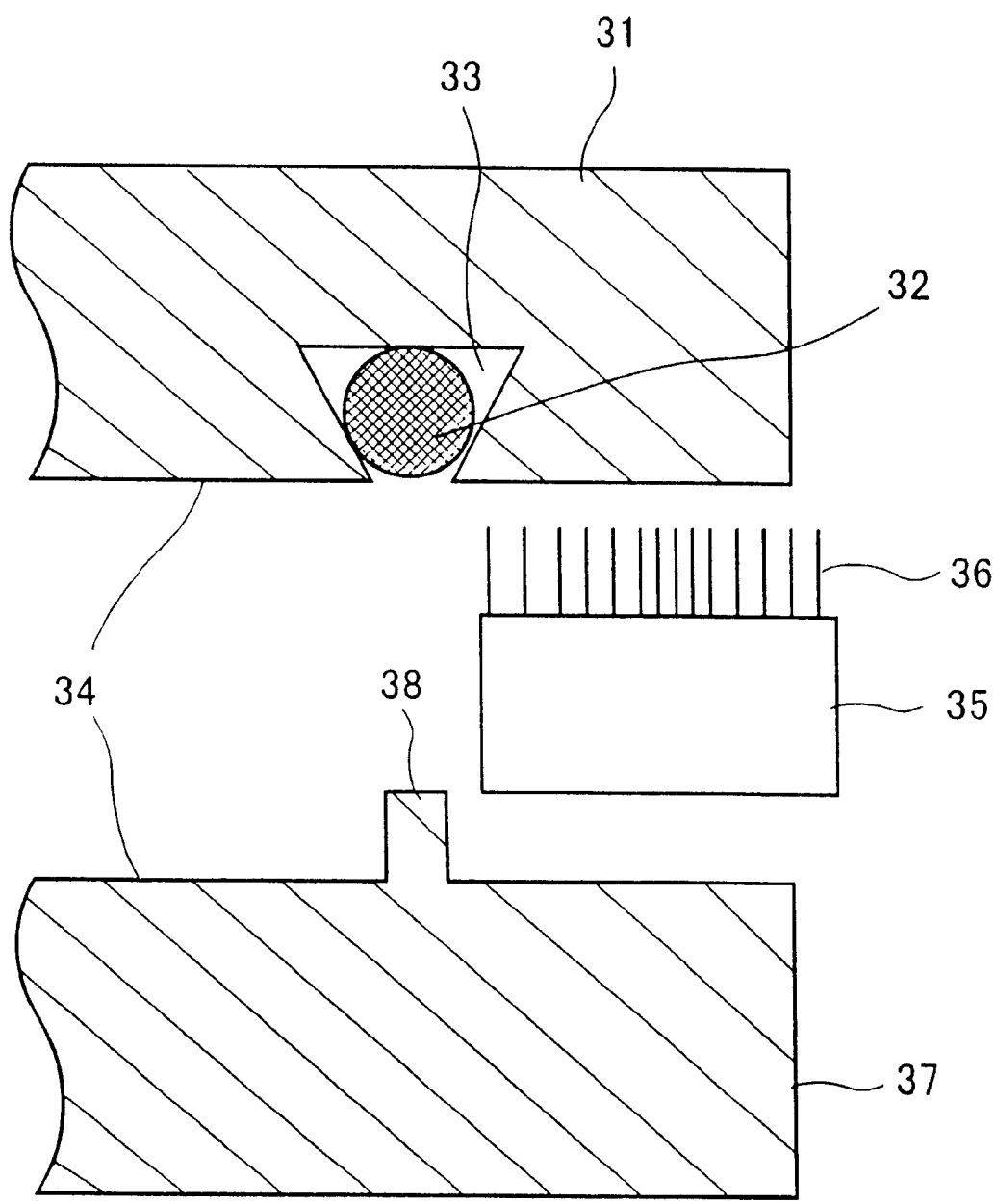
FIG. 3A is a cross-sectional view showing a part of the molding die set, shown in FIG. 2, in which parting surfaces are cleaned.
Figure 3B:
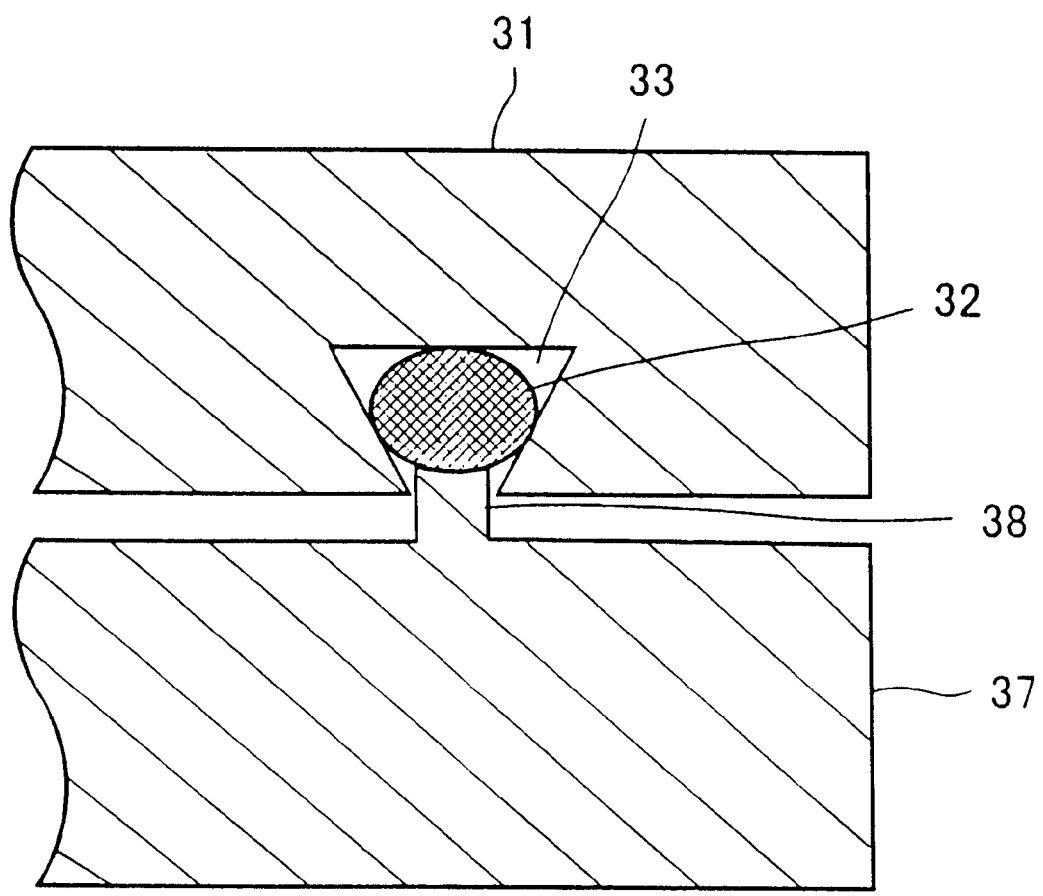
FIG. 3B is a cross-sectional showing a part of the molding die set, shown in FIG. 2, in which upper and lower molding dies are clamped to each other.

In operation, when the upper and lower molding dies 101 and 102 are clamped to each other, the projection 38 of the lower molding die 102 gets into the groove 33 and is in contact with the O-ring 32, as shown in FIG. 3B. As a result, the mold chase units are air-sealed to provide pressure-reduced or vacuumed condition.

After a molding operation, the parting surfaces 34 of the upper and lower molding dies 101 and 102 are cleaned with a brush 36 of a cleaner 35, as shown in FIG. 3A. According to the molding die set, the brush 36 will never be in contact with the O-ring 32, because the O-ring 32 is positioned completely inside the cavity block 31. As a result, the brush 36 does not scrub the O-ring 32; and therefore, the O-ring 32 is not worn away and broken.

In the above described first preferred embodiment, the O-ring 32 is provided on the upper molding die 101 while the projection 38 is provided on the lower molding die 102; however, the O-ring and projection can be provided on the lower and upper molding dies, respectively, in the opposite manner.

Second Preferred Embodiment

Figure 4:
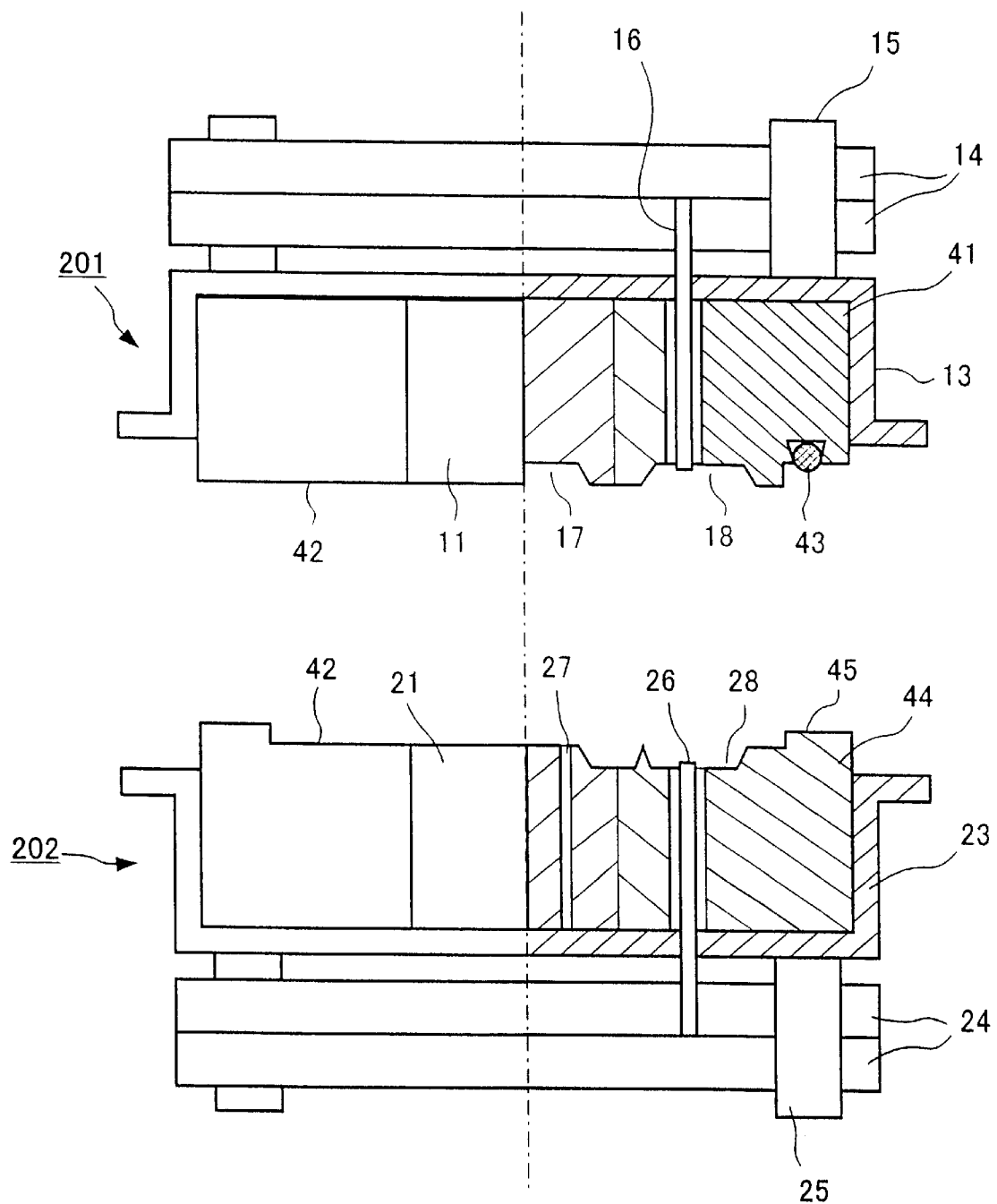
FIG. 4 is a partially cross-sectional view illustrating a molding die set according to a second preferred embodiment of the present invention.
Figure 5:
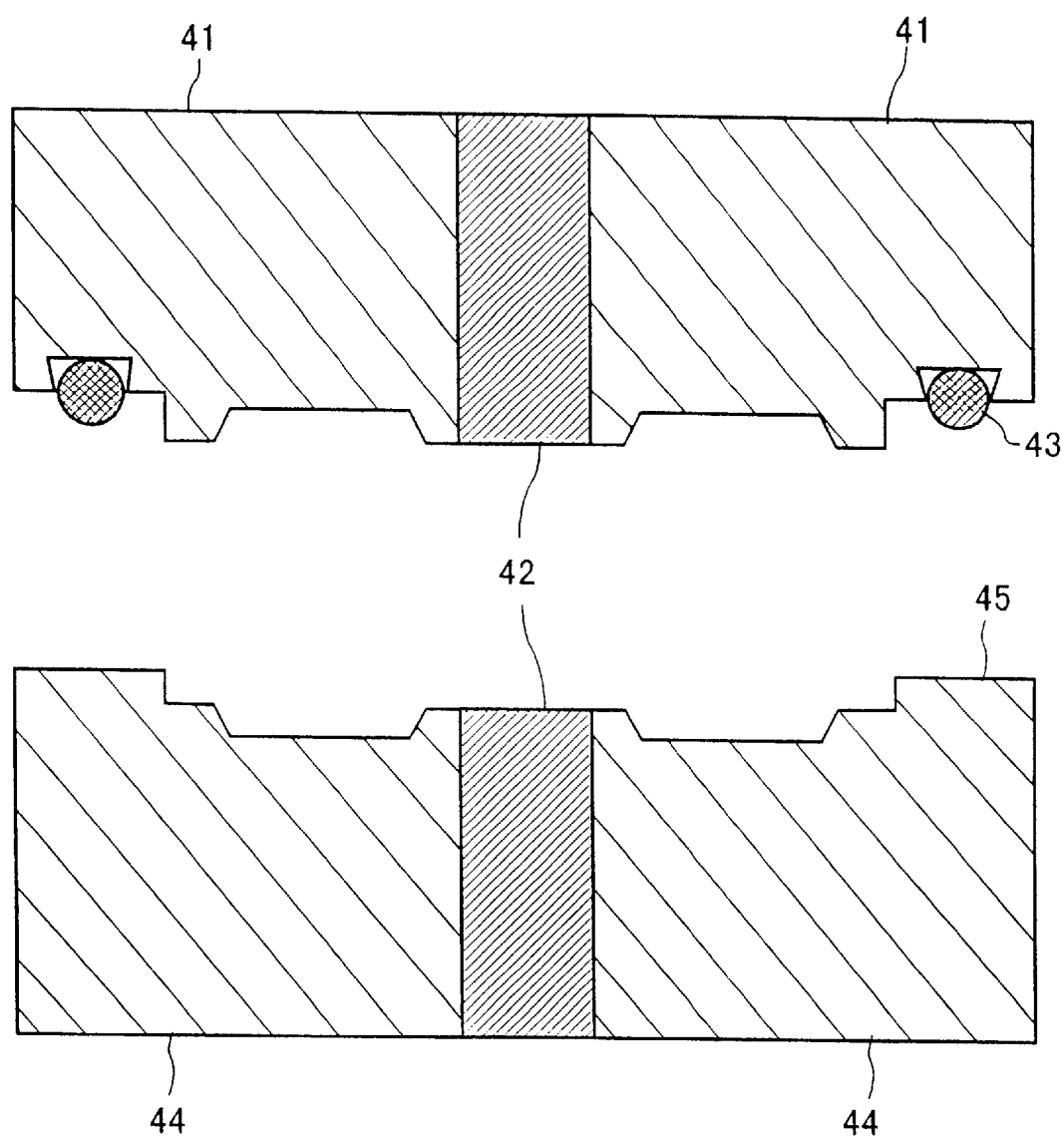
FIG. 5 is a cross-sectional views showing a part of the molding die set, shown in FIG. 4.

FIG. 4 shows a molding die set according to a second preferred embodiment of the present invention, in which the right half is only shown in sectional view. FIG. 5 shows a part of the molding die set, shown in FIG. 4. The molding die set includes an upper molding die 201 and a lower molding die 202. The upper molding die 201 includes a mold chase unit composed of a cull block 11, cavity block 41 and a cavity holder 13. The cull block 11 is arranged at the center of the upper molding die 201. The cavity block 41 is arranged at both sides of the cull block 11, and is supported by the cavity holder 13.

The mold chase unit (11, 41 and 13) is supported by ejector plates 14 and support pins 15. The cull block 11 is provided with a cull 17. The cavity block 41 has a plurality of cavities 18. The upper molding die 201 further includes ejector pins 16 each of which extends through the cavity holder 13 and cavity block 41 for each cavity 18. The ejector pins 16 are used when molded products are unloaded from the molding die set. The upper molding die 201 still further includes an O-ring 43 provided at the bottom of the cavity block 41 to surround cavities 18 and to air-seal and provide pressure-reduced structure.

The lower molding die 202 includes a mold chase unit composed of a pot block 21, cavity block 44 and a cavity holder 23. The pot block 21 is arranged at the center of the lower molding die 202. The cavity block 44 is arranged at the both sides of the pot block 21, and is supported by the cavity holder 23. The pot block 21 has a pot 27 therein.

The mold chase unit (21, 44 and 23) is supported by ejector plates 24 and support pins 25. The cull block 21 is provided with a cull 27. The cavity block 44 has a plurality of cavities 28. The lower molding die 202 further includes ejector pins 26 each of which extends through the cavity holder 23 and cavity block 44 for each cavity 28. The ejector pins 26 are used when molded products are unloaded from the molding die set.

The O-ring 43 is supported in a groove designed to be deep enough so that a peripheral line or the lowest line of the O-ring 43 does not project or stick out beyond a parting surface 42. In other words, the O-ring 43 is positioned inwardly from the parting surface 42. The groove is designed to have a wide bottom and a narrow opening end.

On the other hand, the cavity block 44 of the lower molding die 202 is provided with a projected region 45 that is to be in contact with the O-ring 43. The projected region 45 is formed to project out beyond the parting surface 42 to be in contact with the O-ring 43 when the upper and lower molding dies 201 and 202 are clamped to each other for a molding operation.

In operation, when the upper and lower molding dies 201 and 202 are clamped to each other, the projected region 45 of the lower molding die 202 is in contact with the O-ring 43. As a result, the mold chase units are air-sealed to provide a pressure-reduced or vacuumed condition.

After a molding operation, the parting surfaces 42 of the upper and lower molding dies 201 and 202 are cleaned with a brush, such as shown in FIG. 3A. According to the molding die set, the brush will never be in contact with the O-ring 43, because the O-ring 43 is positioned inwardly from the parting surface 42. As a result, the brush does not scrub the O-ring 43; and therefore, the O-ring 43 is not worn away and broken.

In the above described second preferred embodiment, the O-ring 43 is provided on the upper molding die 201 while the projected region 45 is provided on the lower molding die 202; however, the O-ring and projected region can be provided on the lower and upper molding dies, respectively, in the opposite manner.

Third Preferred Embodiment

Figure 6:
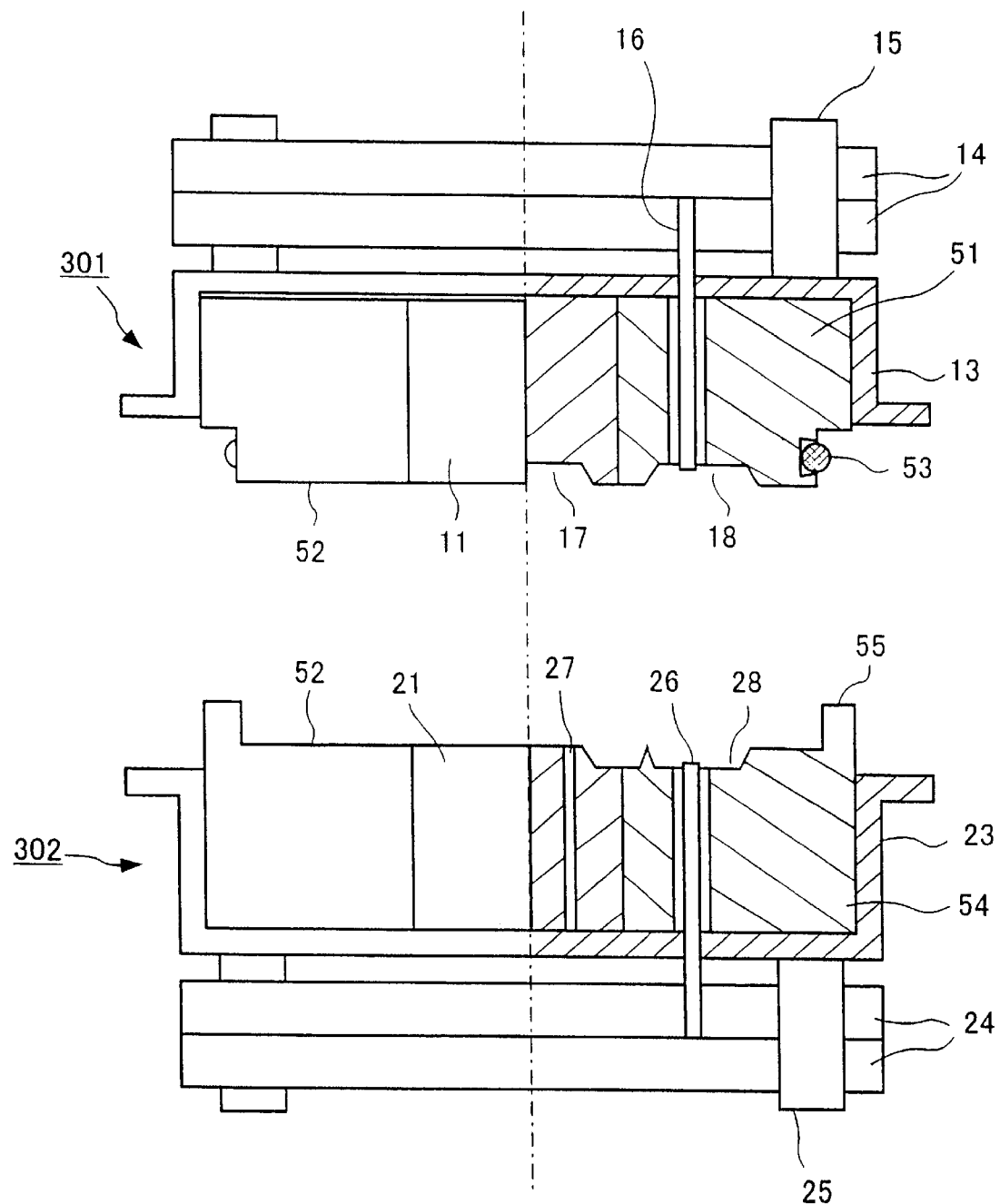
FIG. 6 is a partially cross-sectional view illustrating a molding die set according to a third preferred embodiment of the present invention.
Figure 7:
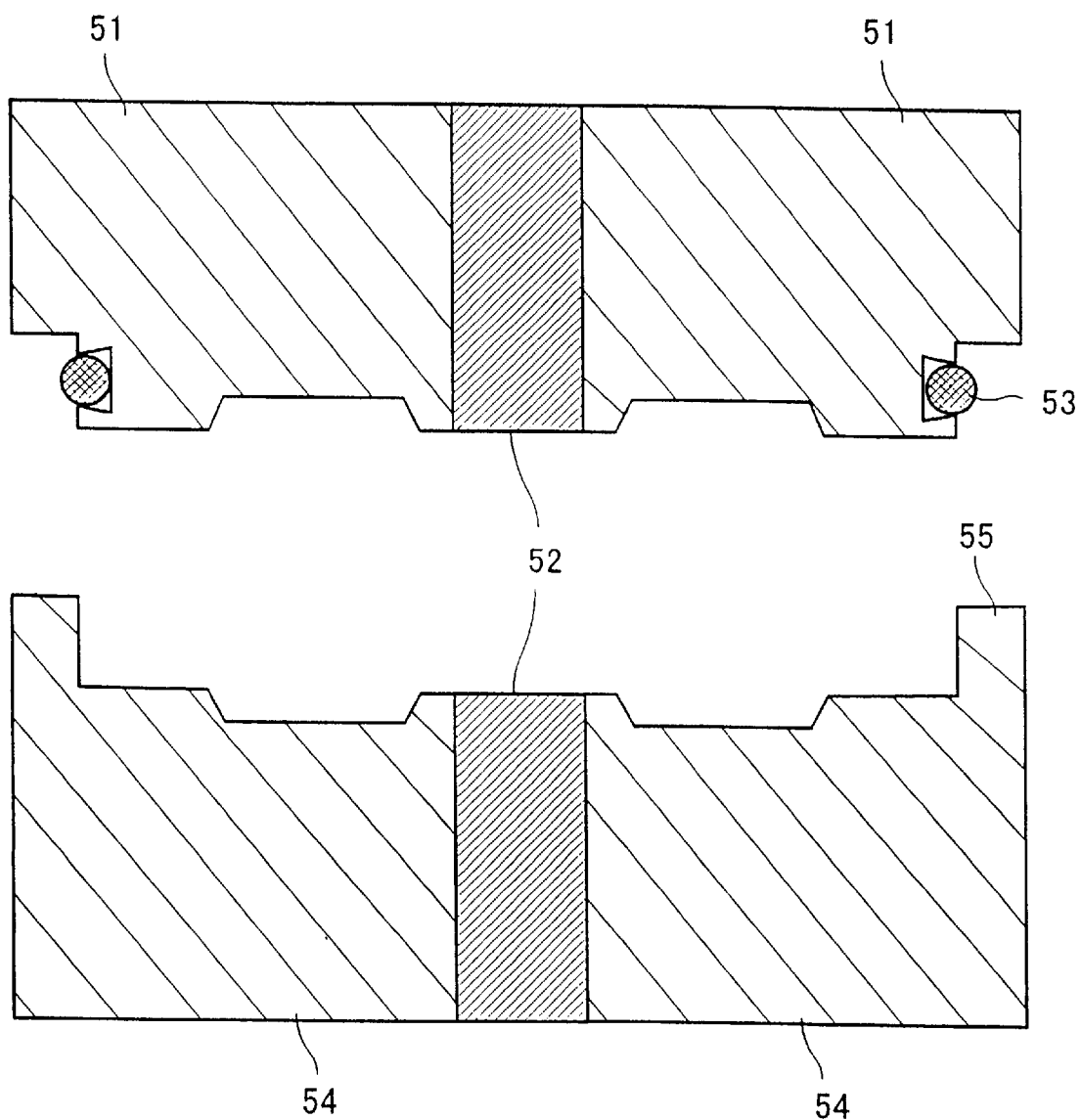
FIG. 7 is a cross-sectional views showing a part of the molding die set, shown in FIG. 6.

FIG. 6 shows a molding die set according to a third preferred embodiment of the present invention, in which the right half is only shown in sectional view. FIG. 7 shows a part of the molding die set, shown in FIG. 6. The molding die set includes an upper molding die 301 and a lower molding die 302. The upper molding die 301 includes a mold chase unit composed of a cull block 11, cavity block 51 and a cavity holder 13. The cull block 11 is arranged at the center of the upper molding die 301. The cavity block 51 is arranged at the both sides of the cull block 11, and is supported by the cavity holder 13.

The mold chase unit (11, 51 and 13) is supported by ejector plates 14 and support pins 15. The cull block 11 is provided with a cull 17. The cavity block 51 has a plurality of cavities 18. The upper molding die 301 further includes ejector pins 16 each of which extends through the cavity holder 13 and cavity block 51 for each cavity 18. The ejector pins 16 are used when molded products are unloaded from the molding die set. The upper molding die 301 still further includes an O-ring 53 provided at a side of the cavity block 51 to surround cavities 18 and to air-seal and provide a pressure-reduced structure.

The lower molding die 302 includes a mold chase unit composed of a pot block 21, cavity block 54 and a cavity holder 23. The pot block 21 is arranged at the center of the lower molding die 302. The cavity block 54 is arranged at the both sides of the pot block 21, and is supported by the cavity holder 23. The pot block 21 has a pot 27 therein.

The mold chase unit (21, 54 and 23) is supported by ejector plates 24 and support pins 25. The cull block 21 is provided with a cull 27. The cavity block 54 has a plurality of cavities 28. The lower molding die 302 further includes ejector pins 26 each of which extends through the cavity holder 23 and cavity block 54 for each cavity 28. The ejector pins 26 are used when molded products are unloaded from the molding die set.

The O-ring 53 is supported in a groove designed so that a peripheral line thereof does not project or stick out of a parting surface 52. In other words, the O-ring 53 is positioned inwardly from the parting surface 52. The groove for the O-ring 53 is designed to have a wide bottom and a narrow opening end.

On the other hand, the cavity block 54 of the lower molding die 302 is provided with a projected member 55 that is to be in contact with the O-ring 53. The projected member 55 is formed to project out of the parting surface 52 to be in contact at the inner side surface with the O-ring 53 when the upper and lower molding dies 301 and 302 are clamped to each other for molding operation.

In operation, when the upper and lower molding dies 301 and 302 are clamped to each other, the projected member 55 of the lower molding die 302 is in contact at the inner side surface with the O-ring 53. As a result, the mold chase units are air-sealed to provide pressure-reduced or vacuumed condition.

After a molding operation, the parting surfaces 52 of the upper and lower molding dies 301 and 302 are cleaned with a brush, such as shown in FIG. 3A. According to the molding die set, the brush will never be in contact with the O-ring 53, because the O-ring 53 is positioned inward from the parting surface 52. As a result, the brush does not scrub the O-ring 53; and therefore, the O-ring 53 is not worn away and broken.

In the above described third preferred embodiment, the O-ring 53 is provided on the upper molding die 301 while the projected member 55 is provided on the lower molding die 302; however, the O-ring and projected region can be provided on the lower and upper molding dies, respectively, in the opposite manner.

Fourth Preferred Embodiment

Figure 8:
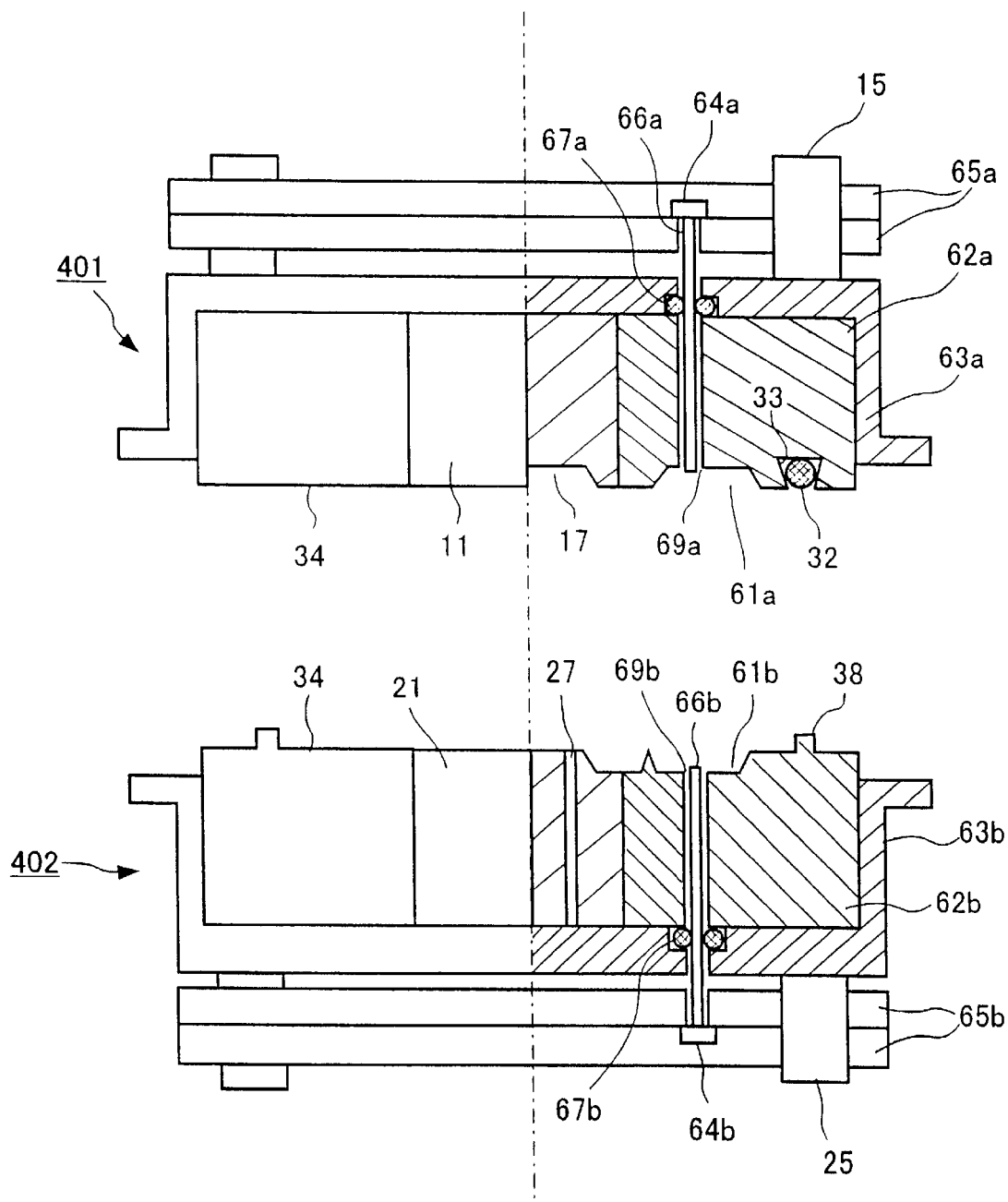
FIG. 8 is a partially cross-sectional view illustrating a molding die set according to a fourth preferred embodiment of the present invention.

FIG. 8 shows a molding die set according to a fourth preferred embodiment of the present invention, in which the right half is only shown in sectional view. The molding die set includes an upper molding die 401 and a lower molding die 402. The upper molding die 401 includes a mold chase unit composed of a cull block 11, cavity block 62a and a cavity holder 63a. The cull block 11 is arranged at the center of the upper molding die 401. The cavity block 62a is arranged at the both sides of the cull block 11, and is supported by the cavity holder 63a.

The mold chase unit (11, 62a and 63a) is supported by ejector plates 65a and support pins 15. The cull block 11 is provided with a cull 17. The cavity block 62a has a plurality of cavities 61a. The upper molding die 401 further includes ejector pins 66a each of which extends through the cavity holder 63a and cavity block 62a for each cavity 61a. The ejector pins 66a are used when molded products are unloaded from the molding die set. The upper molding die 401 still further includes an O-ring 32 provided at the bottom of the cavity block 62a to surround cavities 61a and to air-seal and provide a pressure-reduced structure.

The lower molding die 402 includes a mold chase unit composed of a pot block 21, cavity block 62b and a cavity holder 63b. The pot block 21 is arranged at the center of the lower molding die 402. The cavity block 62b is arranged at the both sides of the pot block 21, and is supported by the cavity holder 63b. The pot block 21 has a pot 27 therein.

The mold chase unit (21, 62b and 63b) is supported by ejector plates 65b and support pins 25. The cull block 21 is provided with a cull 27. The cavity block 62b has a plurality of cavities 61b. The lower molding die 402 further includes ejector pins 66b each of which extends through the cavity holder 63b and cavity block 62b for each cavity 61b. The ejector pins 66b are used when molded products are unloaded from the molding die set.

The O-ring 32 is supported in a groove 33 designed to be deep enough so that a peripheral line or the lowest line of the O-ring 32 is not exposed or stick out of a parting surface 34. In other words, the O-ring 32 is positioned inwardly from the parting surface 34. The groove 33 is designed to have a wide bottom and a narrow opening end.

On the other hand, the cavity block 62b of the lower molding die 402 is provided with a projection 38 that is to be in contact with the O-ring 32. The projection 38 is formed to project out of the parting surface 34 so as to get into the groove 33 and be in contact with the O-ring 32 when the upper and lower molding dies 401 and 402 are clamped to each other for molding operation.

Figure 9:
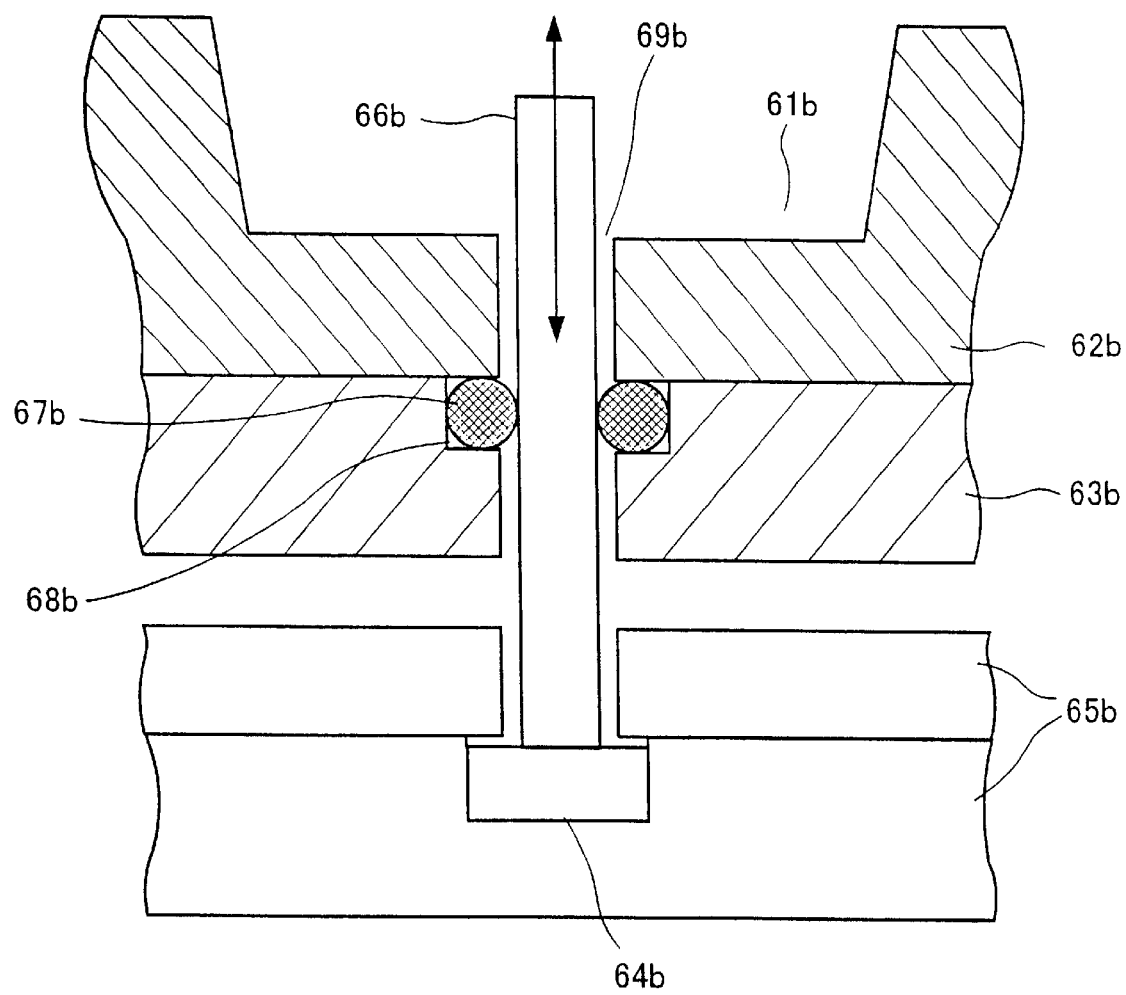
FIG. 9 is a cross-sectional views showing a part of the molding die set, shown in FIG. 8.

FIG. 9 shows a part of the lower molding die 402 around the ejector pin 66b. The molding die set further includes ejectors 64a and 64b connected to one end of the ejector pins 66a and 66b in the ejector plates 65a and 65b, respectively. The ejector pins 66a and 66b are movably extended in ejector holes 69a and 69b formed through the cavity holders 63a and 63b, and cavity blocks 62a and 62b, respectively. The ejector pins 66a and 66b pass through the corresponding cavity (61a and 61b). In FIG. 9, the ejector pin 66b is positioned in the cavity block during a molding process, and then, the ejector pin 66b is moved up when molded products are unloaded after the molding process.

The cavity holders 63a and 63b are provided with grooves 68a and 68b in which O-rings 67a and 67b are supported, respectively. The grooves can be formed in the cavity blocks 62a and 62b.

In operation, when the upper and lower molding dies 401 and 402 are clamped to each other, the projection 38 of the lower molding die 402 gets into the groove 33 and is in contact with the O-ring 32, in the same manner as shown in FIG. 3B. As a result, the mold chase units are air-sealed to provide pressure-reduced or vacuumed condition.

Further, according to the fourth preferred embodiment, an air-leak is not generated around the ejector pins 66a and 66b, so that the pressure in the cavities can be kept at an appropriate level.

Fifth Preferred Embodiment

Figure 10:
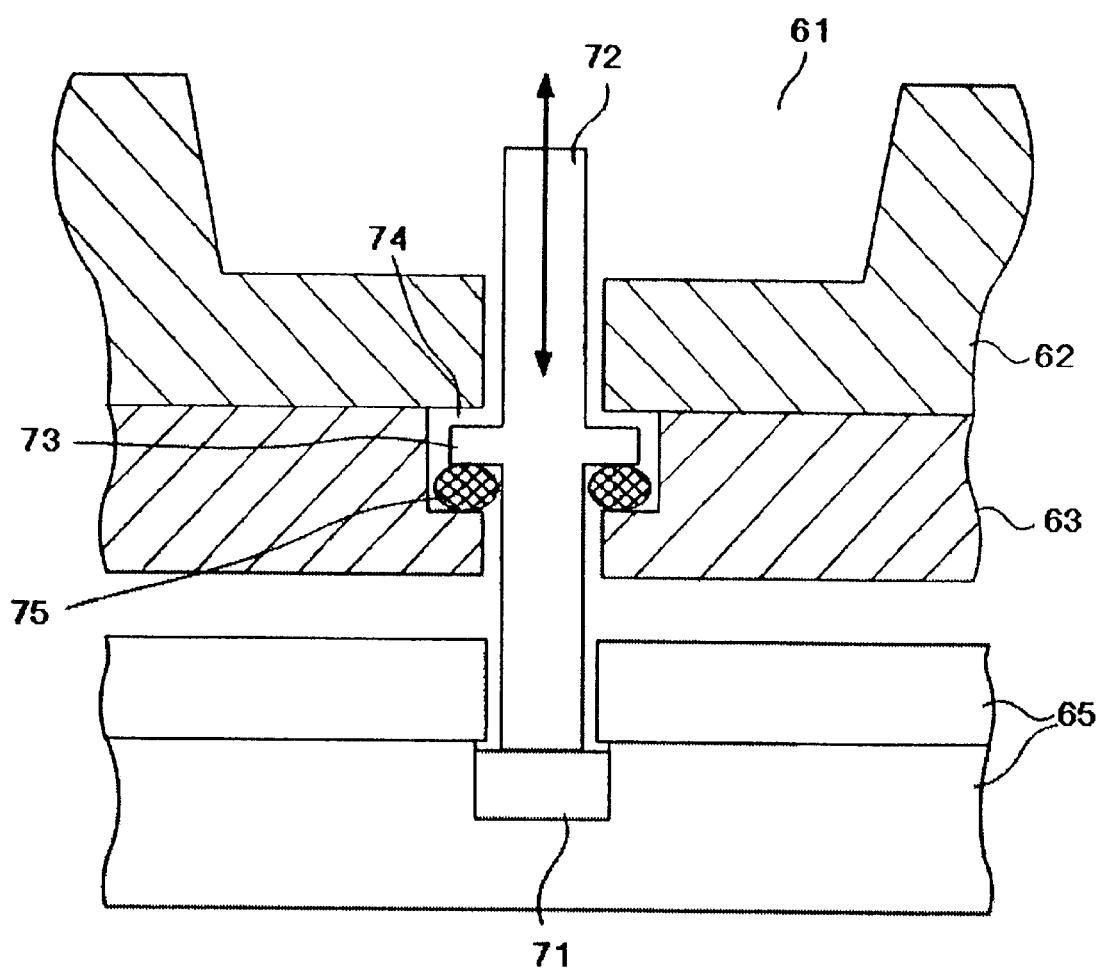
FIG. 10 is a cross-sectional views showing a part of a molding die set according to a fifth preferred embodiment of the present invention.

FIG. 10 shows a part of a lower molding die of a molding die set according a fifth preferred embodiment of the present invention. Since the fifth preferred embodiment is similar to the above-described fourth preferred embodiment, only the differences between them are described in detail to avoid redundant description. The lower molding die includes an ejector pin 72 having a flange 73 to be in contact with an O-ring 75 supported in a groove 74. The ejector pin 72 is sealed by the O-ring 75 between the flange 73 and the cavity holder 63. This type of sealing mechanism can be called "vertical sealing" relative to "horizontal sealing" for the fourth preferred embodiment, shown in FIG. 9.

The ejector pin 72 is positioned under the cavity block 62 during a molding process, and then, the ejector pin 72 is moved up when molded products are unloaded after the molding process.

According to the fifth preferred embodiment, the same or similar advantages to the fourth preferred embodiment can be obtained.

Sixth Preferred Embodiment

Figure 11:
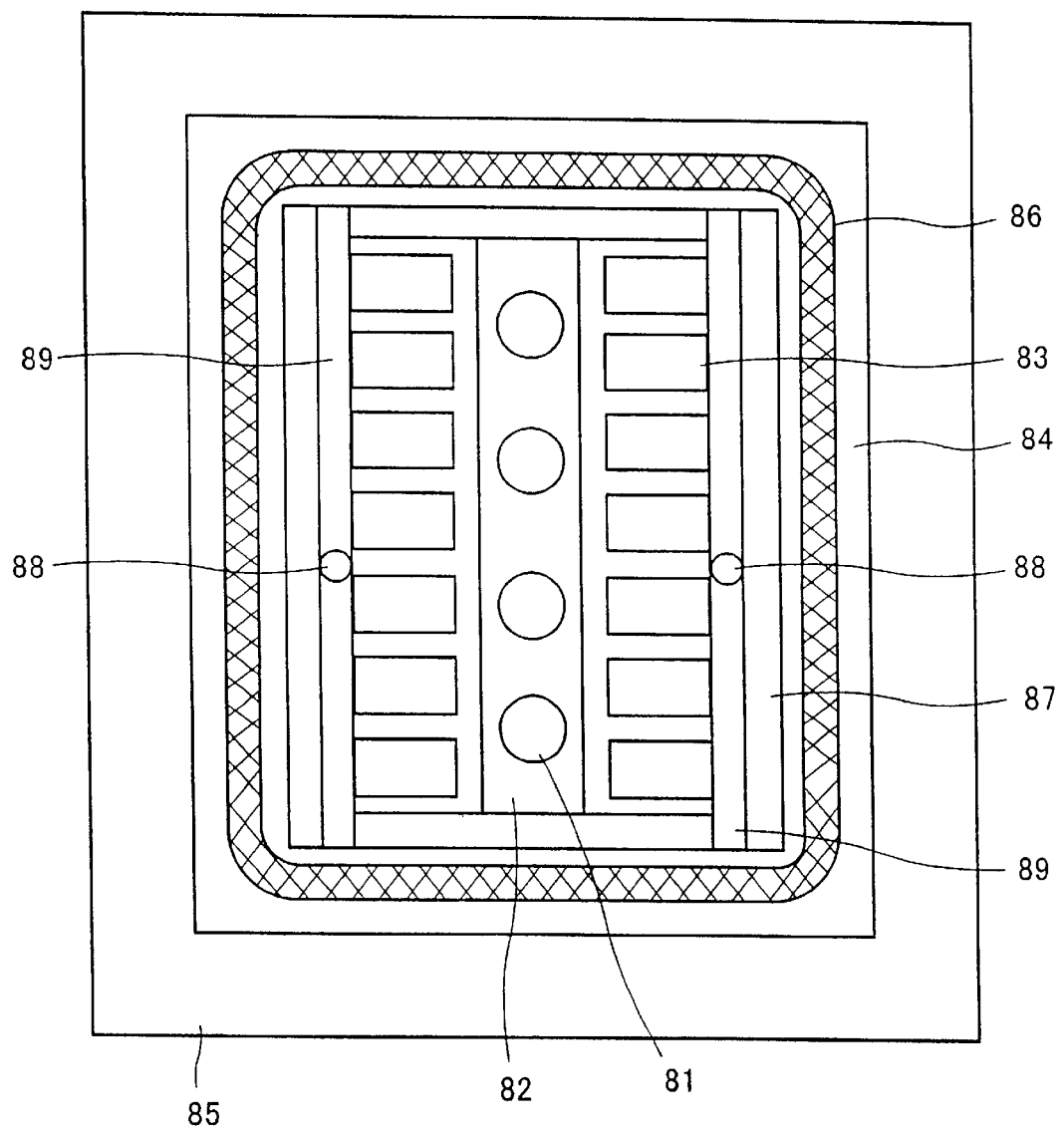
FIG. 11 is a plan view illustrating an upper molding die of a molding die set according to a sixth preferred embodiment of the present invention.
Figure 12:
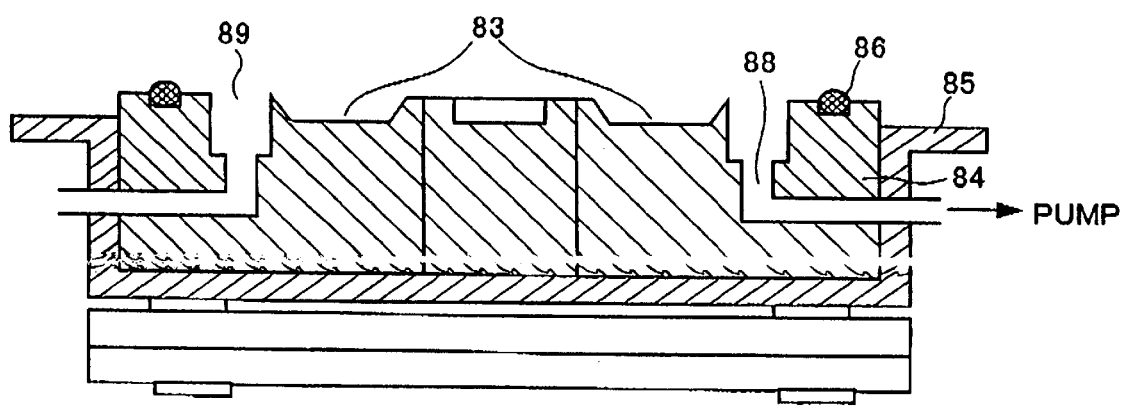
FIG. 12 is a cross-sectional view showing the upper molding die, shown in FIG. 11.

FIG. 11 is a plan view illustrating an upper molding die of a molding die set according to a sixth preferred embodiment of the present invention. FIG. 12 is a cross sectional view showing the upper molding die, shown in FIG. 11. The upper molding die includes a cull block 82 having culls 81; a cavity block 84 having cavities 83; and a cavity holder 85 supporting the cull block 82 and cavity block 84. The cull block 82 is arranged around the center of the cavity holder 85, while the cavity block 84 is arranged at both side of the cull block 82.

The cavity block 84 is provided with an O-ring 86 for air-seal. On the cavity block 84, surface pressure paths 87 are formed inside of the O-ring 86 to allow surface pressure escapes outwardly. The cavity block 84 has a pair of pressure reducing grooves 89, arranged inside the surface pressure paths 87. The pressure reducing grooves 89 are connected to pressure reducing ports 88, which are arranged at the center of the pressure reducing grooves 89 in the up-down direction in FIG. 11. The pressure reducing grooves (paths) 89 may be designed to have a depth of between 0.1 mm to 10 mm. Although, in this embodiment, the pressure reducing grooves 89 are arranged at both sides of the cavity lines, four regions of pressure reducing grooves can be provided to surround all the cavities 83.

The cavity block 84 is provided with a pass-through hole connected to the pressure reducing ports 88 so that air in the cavities 83 are drawn through them. According to the sixth preferred embodiment, the pressure reducing ports 88 are positioned in good balance. In other words, each of the pressure reducing ports 88 is positioned so as to minimize the distance from the farthest cavity. Although, in this embodiment, two pressure reducing ports are provided, more ports can be formed on the cavity block.

According to the sixth preferred embodiment, the pressure reducing grooves 89 are formed around the cavities 83 and the pressure reducing ports 88 are arranged in good balance, so it is easy to keep the cavities 83 at a desired pressure level.

The sixth preferred embodiment is applicable to a lower molding die.

The above-described first to sixth preferred embodiments can be combined in any manners. According to the present invention, it can be reduced the amount of voids conventionally generated in resin-molded IC and LSI chips.

What is claimed is:

1. A semiconductor device package fabricated using a molding die set, wherein the molding die set comprises:
   a first molding die which comprises first cavities and a first parting surface, the first parting surface surrounding the first cavities to define the first cavities;
   a second molding die positioned outwardly relative to the first molding die and which comprises second cavities and a second parting surface arranged to face the first molding die, the second parting surface surrounding the second cavities to define the second cavities, the second parting surface being in contact with the first parting surface during a molding operation, the second parting surface being separated from the first parting surface after the molding operation; and
   an O-ring supported on the first molding die to surround the first cavities, the O-ring being engaged with the second molding die during the molding operation to seal the first and second cavities, the O-ring being positioned completely inwardly relative to the first parting surface both during and after the molding operation, thereby allowing the first parting surface to be cleaned after the molding operation without touching the O-ring.

2. A semiconductor device package according to claim 1, wherein
   the second molding die has a projection which extends outwardly from the second parting surface so that the projection is in contact with the O-ring when the first and second molding dies are clamped to each other.

3. A semiconductor device package according to claim 2, wherein
   the first molding die has a groove in which the O-ring is completely contained, and
   the projection has an end which gets into the groove to be in contact with the O-ring when the first and second molding dies are clamped to each other.

4. A semiconductor device package according to claim 3, wherein
   the groove has a bottom and an opening which is narrower than the bottom so that the O-ring is supported securely therein.

5. A semiconductor device package according to claim 2, wherein
   the first molding die has a groove in which the O-ring is supported so that the O-ring is exposed from the groove toward the second molding die, and
   the projection has an end which is wider than the groove so that an outer surface of the projection is in contact with the exposed portion of the O-ring when the first and second molding dies are clamped to each other.

6. A semiconductor device package according to claim 2, wherein
   the first molding die has a side with a groove in which the O-ring is supported, and
   the projection has an inner side which is in contact with the O-ring in the groove when the first and second molding dies are clamped to each other.

7. A semiconductor device package according to claim 1, wherein
   each of the first and second molding dies has ejector holes each of which extends to the corresponding cavity; ejector pins each of which is movably arranged inside the corresponding ejector hole; and sealing members each of which air-seals the corresponding ejector hole.

8. A semiconductor device package according to claim 7, wherein
   the sealing members are O-rings each of which is arranged to surround the corresponding ejector pin.

9. A semiconductor device package according to claim 8, wherein
   the molding die set further comprises a cavity block comprising the cavities; and a cavity holder supporting the cavity block, wherein
   each of the ejector holes is formed through the cavity block and cavity holder to have a wider diameter portion in which the O-ring is set.

10. A semiconductor device package fabricated using a molding die set, wherein the molding die set comprises:
    a first molding die which has a cavity block that includes cavities, a cavity holder that supports the cavity block, and a parting surface;

a second molding die which has a cavity block that includes cavities, a cavity holder that supports the cavity block, and a parting surface arranged to face the first molding die; and an O-ring supported on the first molding die to surround the cavities and to have a peripheral line which does not extend outwardly from the parting surface;

wherein each of the first and second molding dies has ejector holes each of which extends to the corresponding cavity; ejector pins each of which is movably arranged inside the corresponding ejector hole; and sealing members each of which air-seals the corresponding ejector hole;

wherein the sealing members are O-rings each of which is arranged to surround the corresponding ejector pin;

wherein each of the ejector holes is formed through the cavity block and cavity holder to have a wider diameter portion in which the O-ring is set; and wherein each of the ejector pins has a flange which is in contact with the corresponding O-ring to improve air sealing function.

11. A semiconductor device package according to claim 1, wherein
one of the first and second molding dies comprises pressure reducing paths formed around the cavities; and a plurality of pressure reducing ports connected to the pressure reducing paths, each of the pressure reducing ports being arranged so as to minimize the distance from the farthest cavity.

12. A semiconductor device package according to claim 1, wherein
the cavities are arranged on two parallel lines in each of the first and second molding dies,
the pressure reducing paths are arranged at the both sides of the lines of cavities, and
the pressure reducing ports are arranged at least at the center of each of the pressure reducing paths.

13. A semiconductor device package fabricated using a molding die set, wherein the molding die set comprises:
a molding die which comprises cavities and a first parting surface that surrounds and defines the cavities, an O-ring that provides a seal between the first parting surface and a second parting surface of a further molding die during a molding operation and that is positioned completely inwardly relative to the first parting surface both during and after the molding operation so as to allow the first parting surface to be cleaned after the molding operation without touching the O-ring, the second parting surface being positioned outwardly relative to the first parting surface, ejector holes each of which extends to the corresponding cavity; ejector pins each of which is movably arranged inside the corresponding ejector hole; and sealing members each of which air-seals the corresponding ejector hole.

14. A semiconductor device package according to claim 13, wherein
the sealing members are O-rings each of which is arranged to surround the corresponding ejector pin.

15. A semiconductor device package according to claim 14, wherein
the molding die set further comprises a cavity block comprising the cavities; and a cavity holder supporting the cavity block, wherein
each of the ejector holes is formed through the cavity block and cavity holder to have a wider diameter portion in which the O-ring is set.

16. A semiconductor device package fabricated using a molding die set, wherein the molding die set comprises:
a molding die which comprises a cavity block that has cavities, a cavity holder supporting the cavity block, ejector holes each of which extends to the corresponding cavity; ejector pins each of which is movably arranged inside the corresponding ejector hole; and sealing members each of which air-seals the corresponding ejector hole;

wherein the sealing members are O-rings each of which is arranged to surround the corresponding ejector pin;

wherein each of the ejector holes is formed through the cavity block and cavity holder to have a wider diameter portion in which the O-ring is set; and each of the ejector pins has a flange which is in contact with the corresponding O-ring to improve air sealing function.

17. A semiconductor device package according to claim 13, wherein
the molding die comprises pressure reducing paths formed around the cavities; and a plurality of pressure reducing ports connected to the pressure reducing paths, each of the pressure reducing ports being arranged so as to minimize the distance from the farthest cavity.

18. A semiconductor device package according to claim 17, wherein the molding die is a first molding die; wherein the further molding die is a second molding die; and wherein
the cavities are arranged on two parallel lines in each of the first and second molding dies,
the pressure reducing paths are arranged at the both sides of the lines of cavities, and
the pressure reducing ports are arranged at least at the center of each of the pressure reducing paths.

19. A semiconductor device package fabricated using a molding die set, wherein the molding die set comprises:
a molding die which comprises cavities and a first parting surface that surrounds and defines the cavities, an O-ring that provides a seal between the first parting surface and a second parting surface of a further molding die during a molding operation and that is positioned completely inwardly relative to the first parting surface both during and after the molding operation so as to allow the first parting surface to be cleaned after the molding operation without touching the O-ring, the second parting surface being positioned outwardly relative to the first parting surface, pressure reducing paths formed around the cavities; and a plurality of pressure reducing ports connected to the pressure reducing paths, each of the pressure reducing ports being arranged so as to minimize the distance from the farthest cavity.

20. A semiconductor device package according to claim 19, wherein the molding die is a first molding die, and the further molding die is a second molding die, and wherein
the cavities are arranged on two parallel lines in each of the first and second molding dies,
the pressure reducing paths are arranged at the both sides of the lines of cavities, and
the pressure reducing ports are arranged at least at the center of each of the pressure reducing paths.

* * * * *